3,402,095
ROLLABLE MULTI-PLY ROOFING MATERIAL
Knud Alfred Varfeldt, Aakarp, and Karl Erik Pontus
Thelander, Malmo, Sweden, assignors to Aktiebolaget
Svenska Icopalfabriken, Malmo, Sweden
Filed Aug. 10, 1964, Ser. No. 388,498
Claims priority, application Sweden, Aug. 12, 1963,
8,795/63
11 Claims. (Cl. 161—72)

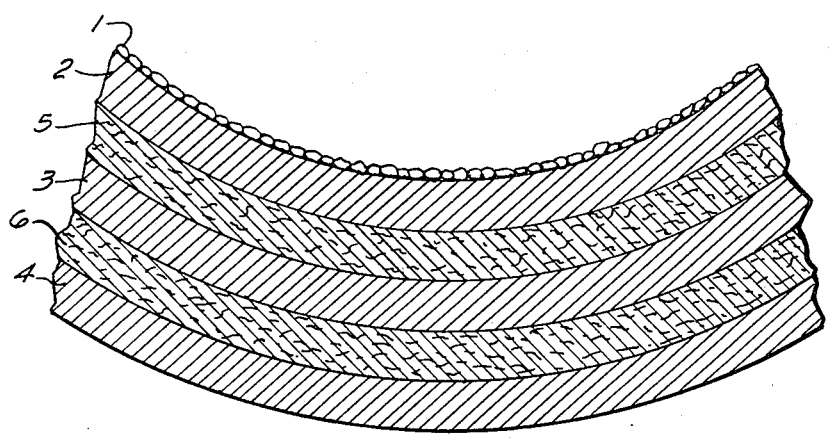

ABSTRACT OF THE DISCLOSURE

A rollable multi-ply roofing material, which comprises a first flexible outer layer of nonfluid bituminous composition with first reinforcing means, preferably consisting of a layer of glass fiber material, embedded in and extending in longitudinal direction of the first layer for limiting the flexibility of the latter to a predetermined degree of flexibility; a second flexible outer layer of nonfluid bituminous composition with second reinforcing means, preferably consisting of a layer of glass fiber material, embedded in and extending in longitudinal direction of the second layer for limiting the flexibility of the second layer to at most one half of the flexibility of the first layer; and a layer of substantially reinforcement-free nonfluid flexible bituminous material interposed between and integral with the first and second layer.

---

The present invention relates to a multi-ply moistureproof sheet material which is particularly suitable for use as a roofing material and, more particularly, the present invention is concerned with an easily rollable multi-ply roofing material of very great durability.

Roofing felt or prepared roofing and similar roofing materials are not only used as the bottom layer for roof coverings of tiles, slates, sheet material or the like but more often as the roof covering itself and, in such case the roofing material is exposed to atmospheric influences. Roofing material used for this type of roofing is covered on both sides with layers of bituminous composition, for example asphalt or tar. Such roofing material needs very little maintenance if its outer side, the one which is exposed to the outer atmosphere and not in contact with the roof, is covered with a protective layer of a dusting material which is preferably in the form of more or less flat granules or lamellas of crushed slate or other natural stone or of ceramic or other suitable material. The protective layer covers the bituminous composition and effectively protects it from atmospheric influences. The protective layer also may give to the surface of the roof a color other than the black of the asphalt or the like serving as the bituminous composition.

Such roofing materials resist weather and moisture for a considerable length of time without requiring periodical recoating of the roof surface.

It has been proposed to perpare such roofing materials with a glass fiber base, in other words, to use a glass fiber mat instead of rag or paper felt in the manufacture of the roofing sheet material. Glass fiber mats combine the advantages of a low price with sufficient thickness and can be processed in the same manner as the former rag felt by passing it through a machine for the impregnation and coating of both sides with bitumen or the like.

As compared with known rag felt, glass fiber mats have considerable advantages due to the fact that they will not swell or rot under the influence of mositure so that the same bitumen which is used for the impregnation in the production of the roofing felt can be used for the coating as well. This has the additional advantage that the impregnation and coating can be done in one application with only one bitumen or the like composition. A further advantage consists in the superior flexibility of a glass fiber base roofing sheet.

Glass fiber based roofing sheets have also been used for roofings having a long life without requiring maintenance. To achieve this effect, two methods are known, namely either to abandon the former two-layer system in favor of a three-layer system, the glass fiber material forming the intermediate layer, or to provide a bituminous outer coating of greater thickness.

Since the use of a three-layer system renders the manufacture of glass fiber base roofing sheets too costly, the second method using a thicker or heavier top coating has been used in practice.

However, certain difficulties were observed, particularly due to the fact that the relatively thin cross section of a thin glass fiber mat could only support and reinforce a coating of limited thickness. Experiments have shown that this limit lies at a soluble amount of bituminous material (without fillers) in the coating of about 1,200 grams per square meter. Thicker or heavier coatings result in glass fiber base roofing sheets having the following disadvantages:

(a) Microscopic or hair cracks in the thick top coating which is not properly supported over its cross section by the glass fiber mat;

(b) Unfavorable conditions when installed during cold weather due to the bitumen being too brittle;

(c) Unduly heavy rolls with too little stability when transported and stored in upright position particularly during warm, summer weather;

(d) Poor tear resistance (resistance to tearing at the edge), a fact that is often observed when applying to a roof glass fiber based roll roofing or when the roof is exposed to strong winds.

The above mentioned difficulties (a)–(d) with glass fiber base roofing sheets having soluble contents of more than 1,200 grams per square meter could also not be avoided by using a reinforced glass fiber mat, i.e., a glass fiber mat which is provided with strands or slivers of filaments or fibers arranged in spaced relationship within the cross section or on the surface of the mat.

It is therefore an object of the present invention to overcome the above disadvantages.

It is a further object of the present invention to provide a roofing felt or rollable multi-ply roofing material capable of withstanding without maintenance atmospheric influences for very prolonged periods of time and which can be produced in a simple and economical manner.

It is yet another object of the present invention to provide a rollable multi-ply roofing material which can be easily wound and will not crack even when wound about a roll or mandrel of relatively small diameter.

Other objects and advantages of the present invention will become apparent from a further reading of the description and of the appended claims.

With the above and other objects in view, the present invention contemplates a rollable multi-ply roofing material comprising, in combination, a nonfluid layer of bituminous composition, the layer having opposite faces, a protective coating of particulate mineral material on one of the faces of the layer of bituminous composition, a first layer of glass fiber material embedded in and extending throughout the layer of bituminous composition spaced from the opposite faces thereof, and a second layer of glass fiber material embedded in and extending throughout the layer of bituminous composition interposed between and spaced from the first layer of glass fiber material and the one face of the bituminous composition, the first layer of glass fiber material having a resistance to bending which is at least twice as great as the resistance to bending of the second layer of glass fiber material.

Thus, according to the present invention an additional layer of glass fiber material is employed which is so arranged that bitumen or the like is embedded between the two layers of glass fiber material so that the entire structure (excluding the protective coating particulate mineral material) will comprise an outer bitumen layer, a glass fiber mat, a center bitumen layer, a glass fiber mat and again an outer bitumen layer. Thus, the two glass fiber mats are embedded in the sheet of bitumen so that they are spaced from each other.

The present invention results in providing two spaced glass fiber mats or the like in the rollable multi-ply roofing material, and, according to a preferred embodiment as will be described below, in adjusting the resistance to bending of the two glass fiber layers in a specific manner.

The types of asphalt or bitumen which are combined with the glass fiber layers are any conventionally used bituminous materials such as asphalts and are well known in the art. Similarly, the protective coating of particulate mineral material is of conventional composition.

The layers of glass fiber material, as will be described in more detail further below, may be glass fiber fabric layers, glass fiber fleece or glass fibers or strands of glass fibers arranged so as to cross-sect each other but without being woven into a fabric.

Disregarding for the time being the adjustment of the resistance to bending of the two glass fiber layers (the term "glass fiber layer" or "layer of glass fiber material" is to encompass glass fiber fleece, fabrics or any other layer arrangement formed of glass fibers), the incorporation of two glass fiber layers in the composite multi-ply roofing material has certain significant advantages which are shown in the following comparisons:

The glass fiber based roofing sheets referred to below as A, B, C, D, E, were produced with the use of different types of glass fiber mats supplied by different manufacturers, some of the glass fiber mats being reinforced over their width and some being not so reinforced. They are:

|  | Thickness (mm.) | Weight (g./m.$^2$) |
| --- | --- | --- |
| A. Parallel reinforcement only at the edges | 0.5 | 53 |
| B. Parallel reinforcement only at the edges | 0.5 | 62 |
| C. Parallel reinforcement only at the edges | 0.6 | 50 |
| D. Parallel reinforcement longitudinally and transversely | 0.65 | 75 |
| E. Reinforced in form of loops | 0.6 | 60 |

Tests on the uncoated, virgin mats led to the following results when performed under similar standardized conditions:

The tearing force performed is read from the Elmendorff instrument in g./cm., the scale being so divided that only $\frac{1}{16}$ of the actual value is shown. The above figures are those shown by the instrument multiplied by 16.

The glass fiber mats A, B, C were reinforced in the longitudinal direction along their edges by glass fiber slivers arranged in close relationship.

The glass fiber mats D were reinforced by glass fiber slivers in the longitudinal, as well as in the transverse direction, the reinforcements being spaced 1 cm. from each other. The glass fiber mats E were reinforced by irregularly arranged loops of reinforcing glass strands. The letter F as used in the following description represents a roofing sheet according to the invention.

Using the types of glass fiber mat hereinbefore mentioned the manufacture of the above mentioned glass fiber base roll roofing was carried out in the same machinery, using the same bitumen and the same dusting material (crushed slate), as is used for the production of the types of roofing felt available called "maintenance free" in the trade and in the northern countries, for example, Sweden. The felt used may be pure rag-pulp felt (wool felt cardboard), having a weight of 450 or 700 grams per square meter respectively. The characteristics of the glass fiber based roofing sheets produced by using glass fiber mats instead of rag-pulp felt have been compared with so-called maintenance-free roofing felts mentioned above. This comparison, especially with the roofing felt with the 700 grams per square meter wool felt rag-pulp felt is a little drastic for mid-European conditions since in these zones mostly felts of lower grams per square meter weight are used. Nevertheless the glass fiber based roofing sheets produced according to the following method will fairly well stand up to this comparison. The particular results are given in the following table. The results were obtained under like conditions prescribed by the standardized test methods.

The manufacture of the rollable maintenance-free roofing and moisture-proof sheets of the invention can be performed by using either a bonded or binder-free glass fiber mat. While in the first case after the impregnation with the bituminous composition building up the intermediate layer between the layers of inorganic material, the additional provision of an upper or lower coating of bitumen or the like prior to the dusting might be suitable, this can be omitted by using a binder-free glass fiber mat which itself will be embedded by saturation with a bituminous material.

|  | A | B | C | D | E | F | With 450 g./m.$^2$ wool felt | With 700 g./m.$^2$ wool felt |
| --- | --- | --- | --- | --- | --- | --- | --- | --- |
| Tensile strength longitudinal direction, kg./50 mm | 40.7 | 21.4 | 21.7 | 53.6 | 23.8 | 69.8 | 52.1 | 64.4 |
| Tensile strength transverse direction, kg./50 mm | 35.7 | 17.5 | 17.3 | 53.0 | 12.9 | 52.1 | 31.6 | 39.9 |
| Tear resistance according to Elmendorff longitudinal direction, g./cm | 640 | 512 | 720 | 1,184 | 912 | 768 | 1,312 | (¹) |
| Tear resistance according to Elmendorff transverse direction, g./cm | 656 | 656 | 912 | 912 | 976 | 1,120 | 1,408 | (¹) |
| Mullen resistance, kg./cm.$^2$ | 8.5 | 3.4 | 2.7 | 9.7 | 3.6 | 17.0 | 10.0 | 18.9 |
| Soluble contents of bitumen, g./m.$^2$ | 1,310 | 1,170 | 1,420 | 1,390 | 1,150 | 2,030 | 1,550 | 2,000 |
| Soluble contents plus stabilized fillers, g./m.$^2$ | 1,680 | 1,500 | 1,820 | 1,780 | 1,470 | 2,300 | 1,760 | 2,220 |
| Weight, g./m.$^2$ | 2,100 | 1,860 | 2,180 | 2,185 | 1,920 | 4,200 | 3,710 | 4,120 |
| Thickness, mm | 1.70 | 1.56 | 1.92 | 1.93 | 1.73 | 3.47 | 2.81 | 3.32 |

¹ Above 1,600.

|  | A | B | C | D | E |
| --- | --- | --- | --- | --- | --- |
| Tensile strength, longitudinal direction, kg./50 mm | 12.7 | 6.3 | 4.1 | 15.5 | 4.7 |
| Tensile strength, transverse direction, kg./50 mm | 9.3 | 4.7 | 3.8 | 11.5 | 2.3 |
| Tear resistance according to Elmendorff, longitudinal direction, g./cm | 80 | 144 | 192 | 640 | 112 |
| Tear resistance according to Elmendorff, transverse direction, g./cm | 112 | 208 | 272 | 752 | 192 |
| Mullen-resistance, kg./cm.$^2$ | 1.5 | 1.0 | 0.9 | 1.9 | 0.7 |

The results of the bending tests were obtained by bending test strips, heated to a certain temperature, around mandrels of different diameter at different temperatures. The smallest diameter was then established in mm. of that mandrel around which the bending was performed without cracking the coating. The best qualities according to the above mentioned table were tested and led to the following results:

| Type of roofing sheet | Soluble contents, g./m.² | Temperature in ° C. | | | | | | | |
|---|---|---|---|---|---|---|---|---|---|
| | | +20 | +10 | +5 | +0 | −5 | −10 | −15 | −20 |
| A | 1,310 | 5 | 5 | 8 | 10 | 30 | 38 | 45 | 65 |
| D | 1,390 | 5 | 5 | 15 | 23 | 35 | 53 | 48 | 73 |
| E | 1,150 | 5 | 8 | 10 | 15 | 33 | 45 | 62 | 73 |
| F | 2,030 | 5 | 8 | 10 | 15 | 30 | 80 | 100 | |

This immediately preceding table proves the surprising fact that the roofing sheet type F, having two layers of glass fiber mats of the same quality as the one-layer glass fiber based roofing sheet type A, spaced apart by an intermediate layer of bitumen and coated on their outer surfaces with bitumen, showed about the same flexibility as the latter at temperatures at which the roofing with maintenance-free roofing material is performed. This is all the more surprising since this degree of flexibility was not to be expected with such a thick bituminous top layer (soluble part) of 2030 grams per square meter.

Since the flexibility of maintenance-free roofing material is only of importance during the actual operation of roofing but not after application of the sheeting has been completed, it is of no importance for the maintenance-free roofing sheet F that its flexibility is low at temperatures below −10° C. At temperatures below 0° C., the application of the roofing material to a roof will not normally be carried out.

However, should high flexibility at low temperatures be important, then the soluble part need only be decreased to 1200 grams per square meter to make a glass fiber based roofing sheet with two layers of glass fiber mat usable under such conditions.

The most important and surprising fact in relation to the roofing sheet of the invention is that it has sufficient strength in the longitudinal as well as in the transverse direction that it compares well with the hitherto known roofing material guaranteed to be maintenance-free for a long period. Furthermore its Mullen-strength is not inferior to that of the known materials. The Mullen-strength is a factor of quality of particular importance for maintenance-free roofing material for production or laying purposes, since the surface of the roof must resist footsteps and similar strains without suffering damage.

Summing up it can be said that the maintenance-free glass fiber based roofing sheet according to the invention combines in a surprising manner all the advantages connected with the substitution of rag-pulp felt by glass fiber mats with the decisive features of approved maintenance-free roofing materials for which, as has been proved, do not require maintenance for ten or even up to fifteen years without much risk.

The manufacture of the maintenance-free glass fiber based roofing sheets with two layers of glass fiber mat according to the invention can be carried out in the manner that one layer of a glass fiber mat is quite normally passed through a roofing paper machinery, i.e. it is first pre-impregnated with a bituminous composition thus saturating the glass fiber mat with the bituminous composition and providing it on both sides with a bituminous coating. The surplus bituminous composition is then removed by a doctor blade or similar device, the coatings being simultaneously straightened and rendered smooth. A second glass fiber mat layer is then brought into contact with the bitumen-coated first layer and the sheet so obtained is passed along the remaining normal path through the roofing paper machine so that both sides of the sheet are provided with a coating onto which crushed slate is sprinkled and into which it is embedded. In this manner, an even bituminous layer between the two layers of glass fiber mat and a thorough saturation of the two glass fiber layers with bitumen is achieved. It has been found advantageous for that impregnation, which, as known, is performed prior to the coating of the upper and lower surface of the sheet and which produces the intermediate layer, to use pure bitumen (without addition of mineral fillers). This leads to a neutral, very flexible zone of pure bitumen which insures the good flexibility and rollability of the sheet. The advantageous features of the maintenance-free glass fiber based roofing sheet according to the invention having two layers of glass fiber mats separated by an intermediate layer of bitumen therefore originate from the fact that both of these glass fiber mat layers resembling a reinforcement of the bitumen are arranged on both sides of the neutral zone of the cross section of the sheet. The thickness of this unfilled bitumen layer in the neutral zone between both of the reinforcing glass fiber mat layers can vary. Its thickness is preferably not much less than the thickness of the glass fiber mats and not much greater than three times the thickness of said glass fiber mats. The glass fiber mats used as a supporting material preferably have a weight of between 30 to 70 grams per square meter.

The maintenance-free glass fiber based roofing sheets of the invention having two layers of glass fiber mat spaced by a layer of bitumen have been produced using commercial glass fiber mats according to Example A, which also were used in the manufacturing of the roofing sheet the test results of which have been shown under type A.

As already mentioned the supporting material may also be a so-called binder-free mat. If this is only impregnated with a liquid bitumen from the upper side, part of this bitumen will penetrate the body of the mat and this results in the actual embedding of the mat within the bituminous mass.

Instead of using two layers of glass fiber mat, a rollable roofing and moisture-proof sheet according to the invention may also be obtained by using one layer of glass fiber mat and one layer of asbestos felt. It is, however, important that the second layer of carrier material should also consist of inorganic material and is used in a thickness which will permit the finished product to be rolled with as little difficulty as possible.

As described up to now, the rollable multi-ply roofing material is of the type which is generally supplied in rolls and which on its outer faces consists of bituminous material such as asphalt or tar and has on one of these outer faces a protective layer or coating of particulate mineral material such as broken natural stone, for instance slate or the like, which protective coating will protect the bituminous material from the deteriorating effect of sun, wind and other atmospheric influences. Embedded in the bituminous sheet are two thin layers of glass fiber material, preferably glass fiber fleece which are spaced from each other in cross sectional direction of the roofing sheet. The thickness of the individual glass fiber fleece or the like is preferably between 0.5 and 0.8 mm. and the bituminous material which is located in between the two spaced glass fiber layers consists preferably of the same composition as the bituminous material forming the surface portions of the roofing sheet. It is not necessary to incorporate in the bituminous material, particularly in the portion which is interposed between the two glass fiber layers any stabilizing mineral fillers.

A further improvement is obtained by utilizing two layers of glass fiber material which differ from each other by their degree of resistance against bending, namely so that when the roofing material is subjected to bending in a direction perpendicular to the cross sectional and longitudinal extension of the roofing material, one of the glass fiber layers, namely the one which is closer to the protective coating of particulate mineral material will offer a lesser resistance to bending which at most will be equal to one-half of the resistance to bending offered by the other glass fiber layer, namely the one which is further distant from the protective coating.

The reason for this is that the roofing material is supplied in rolls in which the protective coating is located inwardly and thus bent to a greater degree than the opposite face of the roofing material. According to the present invention as just described, the glass fiber layer which is closer to the protective coating and thus will be bent to a greater degree than the other glass fiber layer which is located closer to the outer face of the rolled multi-ply roofing material which does not carry the protective coating, will offer less resistance to bending. In other words, the glass fiber layer which is exposed to a more severe degree of bending will offer less resistance to bending than the glass fiber layer which is exposed to a lesser degree of bending.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a schematic fragmentary cross sectional view of a portion of a roll of multi-ply roofing material according to the present invention.

Referring now to the drawing, it will be seen that the roofing material comprises in the described sequence a protective coating or layer 1 of particulate mineral material superposed upon a layer 2 of bituminous composition.

Between layer 2 and a further layer 3 of bituminous composition, a layer of glass fiber material 5 is interposed and embedded, which may be a layer of glass fiber fleece, fabric or any other sheet-like arrangement of glass fibers.

Between bituminous layer 3 and a further bituminous layer 4, a second glass fiber layer 6 is interposed and embedded.

When the thus formed composite or multi-ply roofing material is rolled up about a mandrel or other suitable support it will be rolled up with the protective layer 1 facing the mandrel and thus glass fiber layer 5 will be bent more severely than glass fiber layer 6.

The present invention provides that the resistance of glass fiber layer 6 to bending is to be at least twice as great as the resistance offered by glass fiber layer 5 to the same degree of bending or, in other words, the resistance offered by glass fiber layer 5 to bending will be at most half the resistance offered by glass fiber layer 6 to bending in an equal degree.

As has been described further above, the protective coating or layer 1 and the bituminous layers 2, 3 and 4 consist of conventional materials used in forming roofing sheet materials or roofing felt.

It is preferred to use glass fiber fleece as the layer of glass fiber material, when, however, fabric or fabric-like layers of glass fiber material are used, then it is preferred that the same are formed of only slightly and incompletely twisted glass fiber yarns which have a fluffy structure which will assure a better felting and/or adherence to the surrounding bituminous material.

The layer of glass fiber material may also be in the form of cross-secting glass fibers, threads or strands which are not woven but which adhesively adhere to each other at their points of cross section.

The determination of the resistance to bending of glass fiber fleece or other glass fiber layer structure which are to be utilized according to the present invention is to be carried out under equal conditions so as to obtain directly comparable results.

It has been found that the determination of the degree of bending resistance can be advantageously carried out in the following manner:

Samples are cut from the different glass fiber fleece or webs, which samples have a length of 25 cm. and a width of 5 cm. The samples are so cut that the longer side, i.e. the side having a length of 25 cm. coincides with the longitudinal direction of the web from which the sample is cut.

The sample pieces are positioned horizontally by being gripped or clamped along their width at a distance of 5 cm. from one end of the sample, while the free end which is 20 cm. apart from the gripped portion is supported by a removable support. This support which will serve to maintain the 20 cm. portion of the sample in horizontal position is then removed and the portion of 20 cm. length is thus left without support for a period of 60 seconds. During this time the unsupported portion will bend downwardly under its own weight and after 60 seconds the downward deviation of the free end from the horizontal is measured. The difference in this downward deviation of samples taken from different glass fiber fleece, fabrics or the like may be taken as a measure of the difference in the degree of resistance to bending possessed by the various glass fiber fleece and the like.

Determination of the degree of bending or of the resistance to bending in the manner described above may give somewhat different values depending on which face of the glass fiber fleece is directed upwardly during the test. This is so because in most glass fiber fleece, a binder is applied during production of the fleece in liquid form and this binder is sprayed onto the glass fiber web from above and thus its concentration at the face of the glass fiber web which is first contacted by the spray of binder liquid will be greater than at the opposite face. In this case, it is advisable to arrange glass fiber fleece 5 i.e. the glass fiber fleece which is adjacent the protective mineral layer in the multi-ply roofing material in such a manner that it will have the least resistance to bending. In other words, the tests will determine which face has to be the upper face in order to have the least resistance to bending and this face of the glass fiber fleece is then to be directed towards the layer or protective coating of particulate mineral material.

In order to better understand the improvement which is achieved by incorporating in the multi-ply roofing material two layers of glass fiber material one of which has a resistance to bending which is at least twice as great as the resistance to bending of the other of the two glass fiber layers, and to arrange the glass fiber layer with lesser resistance to bending nearer to the surface of the multi-ply material which carries the protective coating of particulate mineral material, it is to be remembered that generally the bituminous layers such as asphalt or tar layers are applied to the glass fleece layers in horizontal direction and that after application and rolling of the protective coating of particulate mineral material onto one face of the structure, the thus complete roofing material is rolled onto a mandrel or tubular support of relatively small diameter in such a manner that the protective coating of particulate mineral material will face inwardly in the direction towards the mandrel or the like. The purpose of this arrangement is that upon unwinding the roll of roofing material on the roof or the like the free outer surface of the unwound material will be formed by the protective mineral coating.

It follows that upon winding the freshly produced roofing material upon the mandrel, the radius of curvature of the upper glass fiber fleece, i.e. the glass fiber fleece which is nearer to the protective mineral coating will be smaller than the radius of curvature of the glass fiber fleece which is arranged further distant from the protective coating. During rolling the roofing material about the mandrel this has an effect as if, so to say, the glass fiber fleece which is closer to the protective coating and which will be bent with a smaller radius of curvature possesses excessive length as compared with the glass fiber fleece which is located more distant from the protective coating and thus, the upper glass fiber fleece, i.e. the one which is closer to the protective coating must be somewhat upset or compressed while being wound about the mandrel.

If both glass fiber fleece layers have an identical resistance to bending then this resistance in the glass fiber fleece layer closer to the protective coating will cause uneven wrinkles, bends and possibly even cracks therein. This uneven deformation of the upper glass fiber fleece or the like layer will in turn cause formation of bubbles, folds and cracks in the upper bituminous layer adjacent to and possibly also affecting the protective mineral coating. These defects become apparent upon unwinding the rolled up roofing material. For instance, in a roofing material of this type formed with two identical layers of glass fiber fleece each having a thickness of 0.5 mm., these defects were clearly apparent after the roofing material had been rolled about a rod having a diameter of 15 cm. One cannot rely on automatic reduction or healing of these bubbles, folds or cracks upon applying the roofing material to the roof. In any event, even if to some degree these faults would disappear upon unwinding of the rolled roofing material and adhering the same to the roof, nevertheless, from a sales point of view, these faults represent a great disadvantage which up to now could be avoided only by rolling the roofing material upon a mandrel such as a rod or a tube of such large diameter that the difference in length between the two glass fiber fleece layers or the difference in the bending radii became so small in each of the windings of the material that the upper glass fiber fleece could not exert a significant deforming pressure against the outer layers, i.e. against the protective coating of particulate mineral material. However, such rolls which are wound about a mandrel of large diameter are more difficult to handle and will cause greater storage and transportation expenses.

This problem is solved according to the present invention because the above described faults in the upper or outer layer of the roofing material, i.e. the surface portions carrying the protective coating of particulate mineral material will be avoided without requiring an increase in the diameter of the mandrel and thus of the roll of roofing material.

The difference in the resistance to bending between the two layers of glass fiber fleece or the like can be obtained in various ways, for instance by using two glass fiber fleece of different thickness or of different weight per square meter or by varying the type and/or quantity of the binding agent which is applied to the glass fiber fleece. If for technical or economic reasons it is not possible to differentiate the glass fiber fleece or the like by their thickness, weight or binder content, then it is also possible to achieve a lesser resistance to bending of one of the two glass fiber fleece by mechanical deformation of the same. This can be accomplished by part-spherical embossing of the glass fiber fleece, for instance, by passing the glass fiber fleece in contact with an embossing roller so as to form a pattern of part-spherical embossings which may have a diameter of about 5 mm. and the apices of adjacent embossings may be spaced about 1 cm. from each other. The rollers conventionally used for producing part-spherical embossings on metal foil give good results, for this purpose, for instance those which may be used for forming on a copper foil of 0.1 mm. thickness a pattern of part-spherical embossings. By forming in glass fiber fleece of 0.5 mm. thickness such pattern of part-spherical embossings, the resistance to bending of the fleece could be reduced to less than one-quarter of its original resistance.

To further describe the degree of bending resistance of glass fiber fleece layers which may be used for producing the multi-ply roofing material of the present invention, there are described below the results of bending tests carried out in the manner described further above with three different types of glass fiber fleece, namely:

(a) Glass fiber fleece of normal commercial quality having a thickness of 0.5 mm. and a weight of 48.6 gram per square meter;

(b) Glass fiber fleece similar to that described in (a), however, formed with part-spherical embossments having a diameter of about 5 mm., a height of 1.5 mm. and being spaced from each other so that the apices of adjacent embossments within one row were at a distance of about 10 mm., and between adjacent rows at a distance of about 15 mm. The embossments were arranged in parallel rows staggered relative to each other by one-half the distance between adjacent embossments;

(c) A glass fiber fleece having a weight of 45.6 grams per square meter and formed with glass silk reinforcing threads at distances of 10 mm. from each other.

Since in glass fiber fleece there may be minor variations in the bending resistance along the length and width thereof, 20 samples were taken of each of the three types of glass fiber fleece described above.

The extent of downward bending after 60 seconds according to the test described further above is shown in the following table:

|  | Fleece Type 1, mm. | Fleece Type 2, mm. | Fleece Type 3, mm. |
| --- | --- | --- | --- |
| Sample: |  |  |  |
| 1 | 46.5 | 128.5 | 41.0 |
| 2 | 41.5 | 132.0 | 44.0 |
| 3 | 39.0 | 134.0 | 43.5 |
| 4 | 49.5 | 149.0 | 43.5 |
| 5 | 41.5 | 148.0 | 42.0 |
| 6 | 39.0 | 145.0 | 40.0 |
| 7 | 47.0 | 129.0 | 40.5 |
| 8 | 42.0 | 132.0 | 40.0 |
| 9 | 41.0 | 126.0 | 40.0 |
| 10 | 38.0 | 131.5 | 34.0 |
| 11 | 45.0 | 129.0 | 43.0 |
| 12 | 44.0 | 109.5 | 38.5 |
| 13 | 49.0 | 139.5 | 37.0 |
| 14 | 46.0 | 121.5 | 32.0 |
| 15 | 51.0 | 123.5 | 41.0 |
| 16 | 54.0 | 131.5 | 46.5 |
| 17 | 53.0 | 119.5 | 48.0 |
| 18 | 52.5 | 109.5 | 46.0 |
| 19 | 43.5 | 115.0 | 39.5 |
| 20 | 43.5 | 123.0 | 38.5 |
| Average value | 45.3 | 128.8 | 40.9 |

The glass fiber fleece of types 1 and 3 may be used as material for a glass fiber layer 6, i.e. the layer which is farther distant from the protective mineral coating 1 while the glass fiber fleece type 2 may be used to form layer 5, i.e. the layer of lesser bending resistance which is located nearer to the protective mineral layer 1.

As has been pointed out, while the invention is primarily described as utilizing glass fiber fleece, it is also possible to replace the two layers of glass fiber fleece with two layers of glass fiber fabric or other glass fiber structures, or to use one layer of glass fiber fleece and one layer of a different type of glass fiber structure.

What is essential according to the present invention is that there are two glass fiber layers spaced from each other and, according to the preferred embodiment described herein, that the glass fiber layer which is nearer the upper surface of the multi-ply roofing material, i.e. which is nearer to the protective mineral coating has a resistance to bending which is not more than one-half and preferably less than one-half than the resistance to bending of the other glass fiber layer which is located further distant from the protective mineral coating 1.

It will be understood that each of the elements described above, or two or more together, may also find a useful application in other types of multi-ply materials differing from the types described above.

While the invention has been illustrated and described as embodied in a rollable multi-ply roofing material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint or prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A rollable multi-ply roofing material, comprising, in combination, a first flexible outer layer of nonfluid bituminous composition; first reinforcing means embedded in and extending in longitudinal direction of said first layer limiting the flexibility of the reinforced first layer to a pretetermined degree of flexibility; a second flexible outer layer of nonfluid bituminous composition; second reinforcing means embedded in and extending in longitudinal direction of said second layer limiting the flexibility of the reinforced second layer to at most one-half of said predetermined degree of flexibility; and a layer of substantially reinforcement-free nonfluid flexible bituminous material interposed between and integral with said first and second layers.

2. A rollable multi-ply roofing material as defined in claim 1, wherein at least one of said first and second reinforcing means consists essentially of a layer of glass fiber material.

3. A rollable multi-ply roofing material as defined in claim 2, and including a protective coating of particulate mineral material on the free-face of said first outer layer of non-fluid bituminous composition.

4. A rollable multi-ply roofing material as defined in claim 2, wherein said glass fiber material of said first and second reinforcing means, respectively, is a glass fiber fleece.

5. A rollable multi-ply roofing material as defined in claim 2, wherein said glass fiber material of said first and second reinforcing means, respectively, is a glass fiber fabric.

6. A rollable multi-ply roofing material as defined in claim 2, wherein the glass fiber material of said first reinforcing means is a glass fiber fabric and the glass fiber material of said second reinforcing means is a glass fiber fleece.

7. A rollable multi-ply roofing material as defined in claim 2 wherein said layers of nonfluid bituminous composition are asphalt layers.

8. A rollable multi-ply roofing material as defined in claim 2, wherein said layer of glass fiber material of said second reinforcing means is thicker than the layer of glass fiber material of said first reinforcing means so that due to the greater thickness of said layer of glass fiber material of said second reinforcing means, the flexibility of the reinforced second outer layer is at most one-half the flexibility of the reinforced first outer layer.

9. A rollable multi-ply roofing material as defined in claim 2, wherein said layer of glass fiber material of said second reinforcing means is heavier than the layer of glass fiber material of said first reinforcing means so that, due to the greater weight of said layer of glass fiber material of said second reinforcing means, the flexibility of the reinforced second outer layer is at most one-half the flexibility of the reinforced first outer layer.

10. A rollable multi-ply roofing material as defined in claim 2, wherein said layers of glass fiber material include different proportions of glass fiber binding material so that due to the difference in proportion of binding material in the respective layers of glass fiber material, the flexibility of the reinforced second outer layer is equal to at most one-half of the flexibility of the first reinforced outer layer.

11. A rollable multi-ply roofing material as defined in claim 2, wherein said layer of glass fiber material of said first reinforcing means is embossed so as to increase the flexibility thereof in such a manner that, due to the embossed configuration of the glass fiber material of said first reinforcing means, the flexibility of the first reinforced outer layer is equal to at least twice the flexibility of the reinforced second outer layer.

References Cited

UNITED STATES PATENTS

| | | | |
|---|---|---|---|
| 1,941,491 | 1/1934 | Robinson | 161—166 X |
| 2,221,310 | 11/1940 | Gazelle | 161—127 |
| 3,231,453 | 1/1966 | Smith | 161—83 |

ROBERT F. BURNETT, *Primary Examiner.*

R. L. MAY, *Assistant Examiner.*